S. A. ESTABROOK, Jr.
PLOW.
APPLICATION FILED DEC. 28, 1908.

932,256.  Patented Aug. 24, 1909.

WITNESSES

INVENTOR
Sidney A. Estabrook Jr.
BY
ATTORNEYS

UNITED STATES PATENT OFFICE.

SIDNEY A. ESTABROOK, JR., OF PONCHATOULA, LOUISIANA.

PLOW.

932,256.     Specification of Letters Patent.     Patented Aug. 24, 1909.

Application filed December 28, 1908. Serial No. 469,589.

*To all whom it may concern:*

Be it known that I, SIDNEY A. ESTABROOK, Jr., a citizen of the United States, and a resident of Ponchatoula, in the parish of Tangipahoa and State of Louisiana, have invented a new and Improved Plow, of which the following is a full, clear, and exact description.

My invention is an improvement in plows, having for its purpose to provide means to vary the sweep of the plow, whereby the soil may be thrown from furrows close to growing plants at each side, and the plow thus used for different spaced rows.

To this end the invention consists of mold boards attached at each side of the plow share, each mold board having a detachable end wing, and braces between the mold boards, adjustable to permit of the latter being spread apart and moved together in changing the sweep.

Reference is to be had to the accompanying drawings forming a part of this specification, in which similar characters of reference indicate corresponding parts in all the views.

Figure 1:
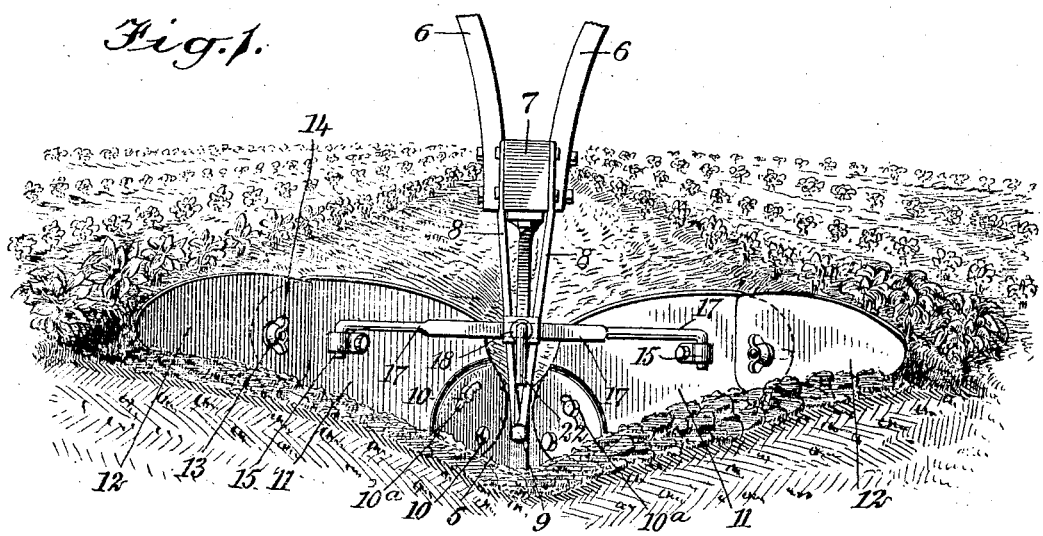
Figure 2:
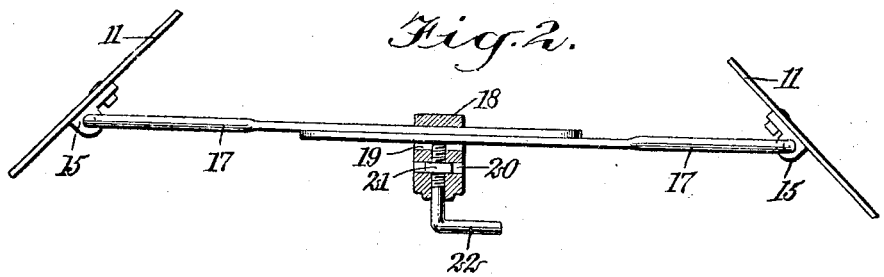
Figure 3:
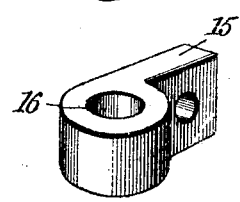
Figure 4:
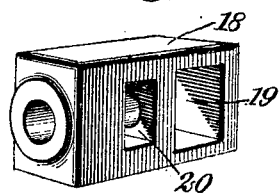

Figure 1 is a perspective view of a plow embodying my invention, showing the manner in which it operates to throw the soil from the furrow to the growing plants at each side; Fig. 2 is a fragmentary plan showing the mold boards and connecting braces, with the connection between the braces in horizontal section; Fig. 3 is a perspective view of one of the sockets or lugs which is attached to the inner face of one of the mold boards for receiving the end of one of the braces; Fig. 4 is a perspective view of the clamp for binding the overlapping ends of the braces in adjusted position; and Fig. 5 is a fragmentary view, showing an additional adjustable wing on the mold board.

Any ordinary form of plow may be used for applying my improvements, that shown embodying the plow share 5, handles 6, 6, a beam 7 to which the handles are bolted or otherwise connected, and braces 8, 8, rigidly connecting the share to the beam by the center bolt 9. To the rearwardly-diverging faces of the share are adjustably attached by means of bolts 10, two being shown at each side, mold boards 11, the same being of the conventional type for plow construction. The bolts 10 pass through arcuate slots $10^a$ in the share, as clearly shown in Fig. 1. Each mold board has a detachable end wing 12 which extends the sweep of the plow and is preferably secured in place by a bolt 13 passing through the overlapping ends and having a thumb-nut 14.

To the inner face of each mold board is bolted or otherwise secured a lug 15 having a vertical opening 16 providing a socket for the downwardly-turned end of a brace 17. The braces 17, as best shown in Fig. 2, have flattened overlapping inner ends passing through a clamping block 18 which is provided with two adjacent transverse slots 19 and 20 respectively, the former receiving the braces and the latter containing a nut 21 through which a clamping screw 22 is threaded, this screw preferably having an offset handle and passing longitudinally through the rear portion of the block and bearing on the overlapping ends of the braces. By loosening the nuts 10 the mold boards may be spread apart or drawn together to give the required sweep, and rigidly held in this position by tightening the screw 22. In this way any sweep may be given the plow within certain limits, whereby it is possible to throw the soil from furrows to ridges of growing plants or rows spaced apart different distances.

Figure 5:
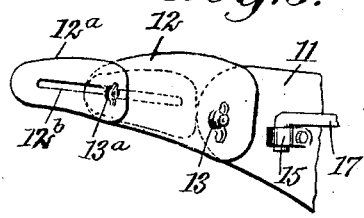

In Fig. 5 I have shown the end wing 12 provided with a further outwardly-extending wing $12^a$, which is shown to have a longitudinal slot $12^b$ through which a bolt $13^a$ passes, the latter being threaded or otherwise fixed to the end wing 12. The object of this additional wing, which is pointed at its outer end, is to carry the soil directly under the foliage of growing plants. When the wing $12^a$ is not in use it is slid to the rear of the wing 12.

Having thus described my invention, I claim as new and desire to secure by Letters Patent:

1. The combination of a plow share, mold-boards pivotally connected to the opposite sides of the share to swing in a plane approximately parallel therewith, braces connected to the inner faces of the mold-boards, having overlapping inner end portions, a block having a transverse opening receiving the overlapping ends of the braces and supported thereon, and a screw carried by the block to clamp the overlapping ends of the braces in adjusted position within the opening.

2. The combination of a plow share, mold-boards connected to the opposite sides of the share, braces extending between the mold boards, having overlapping inner ends, and a clamp for adjustably securing the overlapping ends of the braces together, carried by and freely movable with the braces.

3. The combination of a plow share, mold boards connected to the opposite sides of the share and forming a continuation thereof, wings detachably connected to the mold boards, and auxiliary wings carried on the end wings and pivotally and longitudinally adjustable with respect thereto.

In testimony whereof I have signed my name to this specification in the presence of two subscribing witnesses.

SIDNEY A. ESTABROOK, Jr.

Witnesses:
  CLOYD C. CLARKE,
  WILLARD M. MITCHELL.